Figure 1:
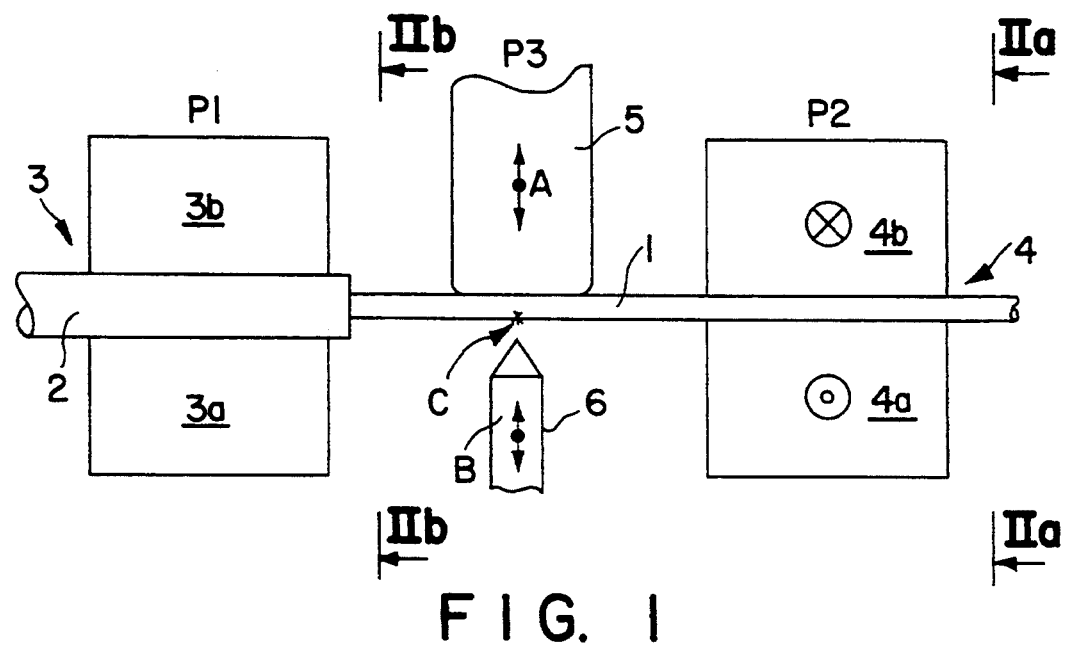

United States Patent [19]

Michel et al.

[11] Patent Number: 5,368,211

[45] Date of Patent: Nov. 29, 1994

[54] APPARATUS FOR THE OBLIQUE CUTTING OF ONE OR OF SEVERAL OPTICAL FIBERS

[75] Inventors: Boitel Michel, Perros-Guirec; Jean-Marc Cailleaux, Lannion; Mahe Thierry, Rospez, all of France

[73] Assignee: France Telecom, France

[21] Appl. No.: 42,211

[22] Filed: Apr. 2, 1993

[30] Foreign Application Priority Data

Apr. 14, 1992 [FR] France .................. 92 04891

[51] Int. Cl.$^5$ .................................................. B26F 3/00
[52] U.S. Cl. .................................. 225/96.5; 225/101; 225/102
[58] Field of Search ............... 225/102, 96.5, 101, 225/96

[56] References Cited

U.S. PATENT DOCUMENTS

| | | | |
|---|---|---|---|
| 4,216,004 | 8/1980 | Brehm et al. | 225/96.5 X |
| 5,048,908 | 9/1991 | Blonder et al. | 225/96.5 X |
| 5,129,567 | 7/1992 | Suda et al. | 225/96.5 |
| 5,188,268 | 2/1993 | Hakoun et al. | 225/96.5 |

FOREIGN PATENT DOCUMENTS

| | | |
|---|---|---|
| 0442202 | 8/1991 | European Pat. Off. . |
| 2661635 | 8/1991 | France . |
| 57-24903 | 9/1982 | Japan . |
| 1598186 | 9/1981 | United Kingdom . |

OTHER PUBLICATIONS

French Search Report, Jan. 93.

*Primary Examiner*—Richard K. Seidel
*Assistant Examiner*—Kenneth E. Peterson
*Attorney, Agent, or Firm*—Laff, Whitesel, Conte & Saret

[57] ABSTRACT

An apparatus cuts one or several optical fibers obliquely. The cutting edge (6) creates the beginning of a break on the fiber that has first been subjected to a torsion and to a tension. The fiber is immobilized upstream of the cutting point. Then, the fiber is tightened downstream from the cutting point. Next, a tension is exerted on the part of the fiber or fibers located between the application of the tightening (3,4). The tightening also involves an exertion of a torsion force upon the optical fiber.

13 Claims, 3 Drawing Sheets

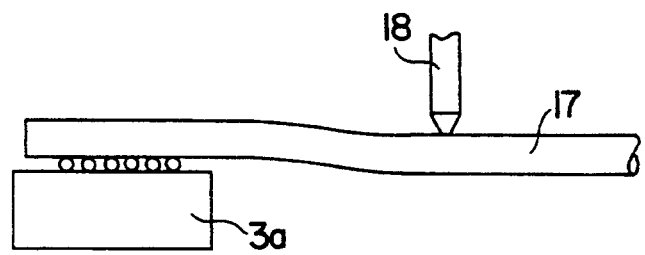
F I G. 4
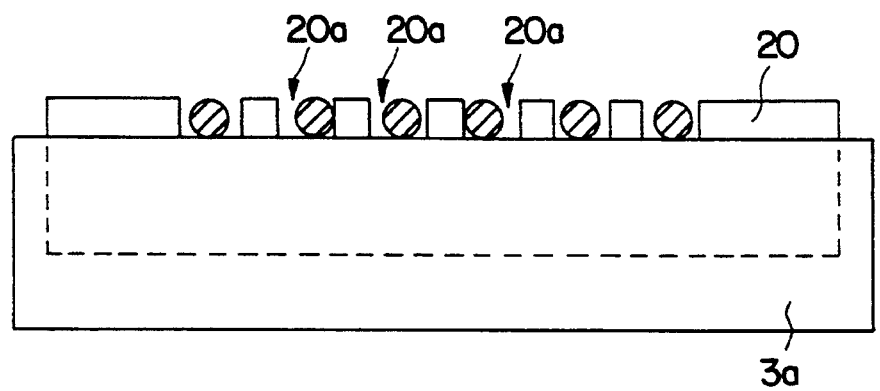
F I G. 5
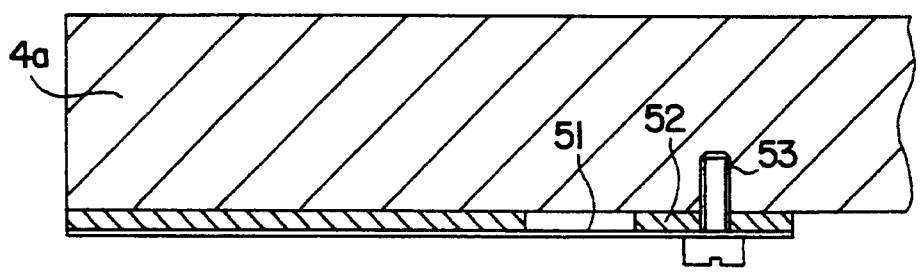
F I G. 6

APPARATUS FOR THE OBLIQUE CUTTING OF ONE OR OF SEVERAL OPTICAL FIBERS

The present invention relates to an apparatus for the oblique cutting of one or of several optical fibers or of a ribbon of optical fibers, an apparatus of the type in which a cutting edge creates a break start on said fiber or fibers that have (have) first been subjected to a torsion and to a tension.

The advantage of the oblique cutting of optical fibers is well known, especially to become free from the drawbacks resulting from the reflection of light at the level of the optical fiber splicings.

Oblique cutting apparatuses are already known, and it will be useful to refer to the patent FR-A-2-661 635 that describes such an apparatus. The apparatus in that publication essentially comprises a squeezing device that immobilizes the fiber in a first point, a rotating squeezing device to immobilize the fiber in a second point and to subject it to a torsion around its longitudinal axis, a third squeezing device to immobilize it, after torsion, in a third point located between the first point and the second point, a form and a cutting blade in order, on the one part to subject the fiber to a tension after it has been twisted and, on the other part, to create the beginning of a break in the fiber.

With this apparatus, the fiber is cut in a state of tension and of torsion, achieving an oblique break of the fiber in a plane that is slanted relative to the axis of the fiber.

The problem that arises with this type of apparatus is that of obtaining a cutting angle that can be reproduced with great precision of the order of one degree, this within a thermal range of zero to forty degrees Celcius. That precision makes it necessary to provide apparatuses the elements of which themselves have precise dimensions, especially in the case of the above-described apparatus, for the member that governs the torsion of the fiber.

Besides, the apparatus described does not permit the cutting of a ribbon of fibers in which the fibers are arranged with a small pitch.

The purpose of the present invention therefore is to propose an apparatus for the oblique cutting of fibers that does not have the above-mentioned drawbacks.

To that end, an apparatus according to the invention has a first means to tighten the fiber or fibers in order to immobilize it (them) upstream from the cutting point, a second means to tighten these fibers downstream from the cutting point, a means to exert a tension force on the part of the fiber or fibers between the above tightening means. It is characterized in that the second means also is provided to exert a force of torsion on said fiber part.

To that end, this second means comprises two clamping jaws one of which at least can move relative to the other in a direction transverse to the longitudinal axis of the fiber, while exerting a tightening force on that fiber, this having as a result to drive said fiber along in a rolling motion between the above-two clamping jaws and thus to create the above-mentioned torsion of the fiber and the beginning of its being put under tension.

According to another characteristics of the present invention, the means to exert the tension force comes into play at the same time as and after the second means has exerted its torsion force on said fiber part.

According to another characteristic of the invention, the two clamping jaws are movable relative to each other, in a transverse direction relative to the longitudinal axis of the fiber.

According to another characteristic of the present invention, one of the two clamping jaws is constituted by a flexible lever, that is subjected to the action of means to cause it to bend between its pivoting point and it point of contact with the fiber, the point of contact with the fiber then moving in the transverse direction and thus creating the above-mentioned torsion of the fiber.

According to another characteristic of the present invention, the means to cause the bending of the above-mentioned lever are driven by a governing lever that also drives a form in the transverse direction, relative to the longitudinal axis of the fiber or fibers, in order to exert the mentioned tension force on the mentioned part of the fiber.

According to another characteristic of the invention, the above means to cause the lever to bend comprise a connecting member to transmit an approximately perpendicular force to the lever between its point of contact with the fiber and its pivoting axis.

According to another characteristic of the invention, said connection member is mounted on a transmission arm elastically connected to the governing lever.

According to another characteristic of the invention, that connection means is constituted by a regulating screw screwed into the transmission arm.

Figure 2:
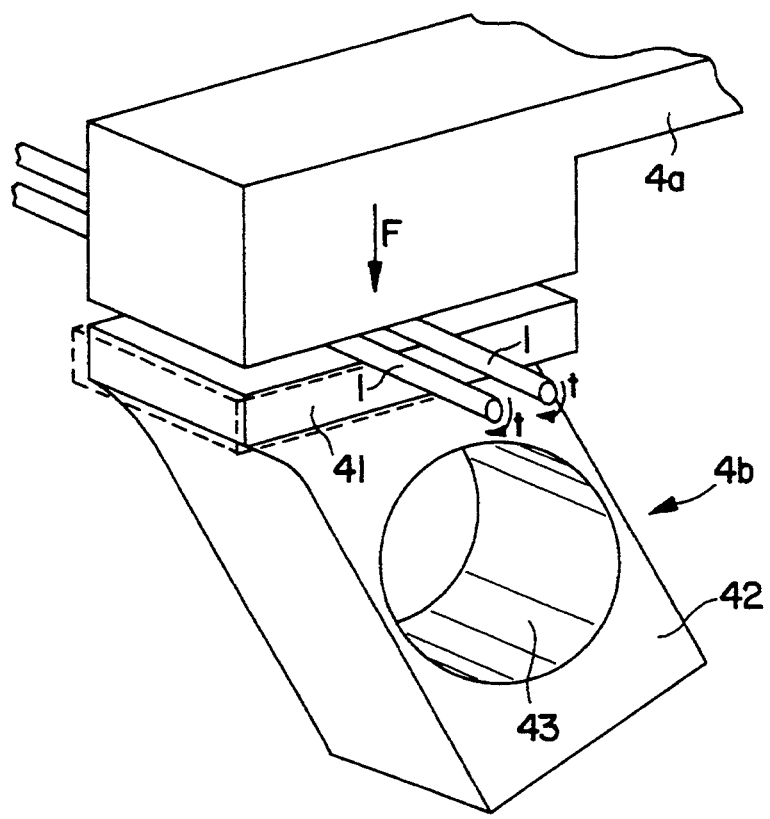
Figure 3A:
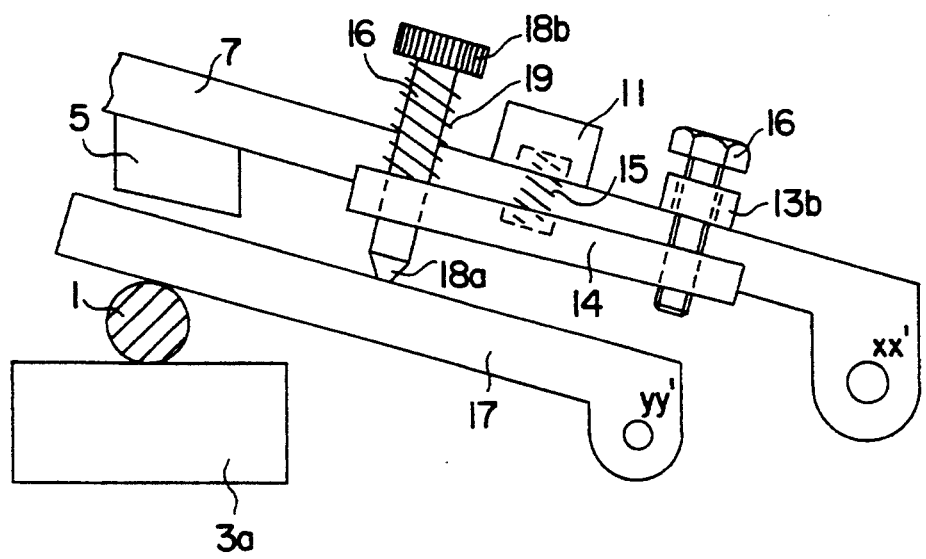
Figure 3B:
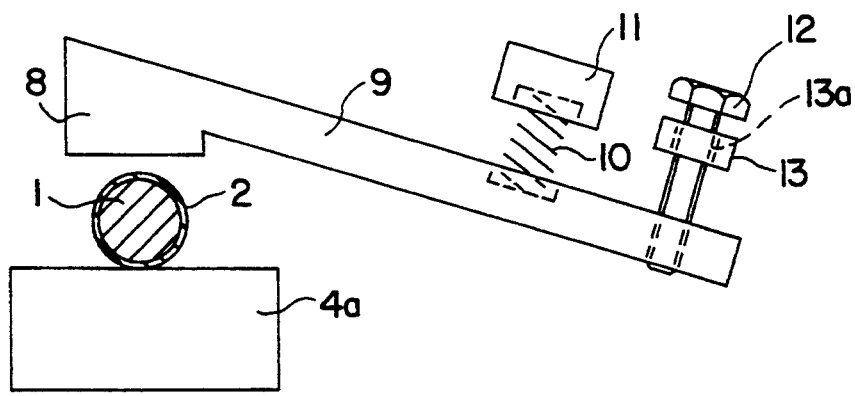

The above-mentioned characteristics of the invention, as well as others, will appear more clearly upon reading of the following description of one example of execution, that description being given in relation with the attached drawing in which:

FIG. 1 is a schematic view of an apparatus according to the invention,

FIG. 2 is an example of an embodiment of a tightening means in an apparatus according to the invention, FIGS. 3a and 3b are schematic views of one example of an embodiment of an apparatus according to the invention, respectively downstream from plane IIa/IIa and from plane IIb/IIb in FIG. 1, FIG. 4 is a diagram that shows the use of the apparatus according to the invention, to cut several fibers, FIG. 5 is a view that shows a means for the positioning of the fibers prior to their being cut, and FIG. 6 is a view that shows a means for offsetting diameter differences among the fibers.

There will first be described one embodiment of the invention by means of which it is possible to cut one single fiber. It will then be seen that this embodiment can also serve to cut several fibers, for example several fibers in a ribbon of fibers.

The apparatus schematically shown in FIG. 1 is meant for obliquely cutting an optical fiber 1 that must, in order for its cutting to be executed, be stripped near its end. Fiber 1, however, can be sheathed on its part upstream from the cutting point and, especially, at the level of the point of immobilization of that upstream part.

The apparatus according to the invention comprises, in a first point P1, a first means constituted by a tightening means 3 the two clamping jaws 3a and 3b of which are meant to tighten the fiber 1, in its non-stripped part 2 for example, in order to immobilize it.

It also comprises, in a second point P2, a second means constituted by a second tightening means 4 in which one at least of the two jaws 4a and 4b can move relative to the other, in a transverse direction relative to the longitudinal axis of the fiber 1. There are respectively shown by a circle with an enclosed cross (the tail feathers of an arrow) and by a circle with a point (the point of an arrow), the opposite displacements of the two clamping jaws 4a and 4b relative to each other, when both of them are sliding. The clamping jaws 4a and 4b of tightening means 4 are meant to tighten the fiber 1, in its stripped part downstream from the desired cutting point C and, by their transverse displacement relative to each other, to cause a rolling of that part of fiber 1.

Thus, held fixed by the first tightening means 3 and driven into a rotation motion by the second tightening means 4, fiber 1 is subjected to a torsion force but also, as a consequence, to a slight tension force.

It will be noted that one of the clamping jaws 4a or 4b, or both of them, are provided so that they can exert a tightening force F on fiber 1.

The apparatus according to the present invention further comprises, in a third point P3 located between the first point P1 and the second point P2, means to create a tension in fiber 1. These means are constituted, according to one embodiment, by a form 5 transversely movable relative to the longitudinal axis of fiber 1 (arrow A). By exerting a transverse force on the part of fiber 1 between the two tightening means 3 and 4, the form 5 places that part of the fiber under tension.

A cutting edge 6, which may be a diamond, for example, also is transversely movable in direction of the form 5 (arrow B). The cutting edge 6 marks the fiber 1 and creates the beginning of a break, in a point C on the part of fiber 1 between the two tightening means 3 and 4. Because this part of fiber 1 is subjected, by means of form 5, to a traction force and, by means of tightening means 4, to a torsion force, that beginning of a break propagates obliquely through the fiber, causing the breaking of fiber 1 along a plane slanted with an angle that is a function of the intensity of the forces to which it is subjected.

The application of the tightening force F on the fiber or fibers and the relative displacement of the clamping jaws 4a and 4b can be done in two stages. For example, force F is first applied on the fiber or fibers 1, then one of the two clamping jaws 4a or 4b or both of these jaws, are transversely driven into translation so as to create a relative displacement.

FIG. 2 shows an embodiment of a tightening means 4 according to the invention in which, as it will be seen below, the application of the tightening force F and the relative displacement of the two clamping jaws 4a and 4b are simultaneous. According to that embodiment, the tightening means 4 comprises the clamping jaw 4a to exert the force F transversely directed on the fiber or fibers 1 that rest on the flat part 41 of clamping jaw 4b. Clamping jaw 4a could be, for example, the arm of a lever. Clamping jaw 4b, is made up of a beam 42 that is slanted relative to the direction of the tightening force F and that is pierced with a hole 43 that greatly decreases its inertia so that it can bend.

At the time the fiber or fibers 1 are tightened, clamping jaw 4b, because of its slant and of its low inertia, slightly bends, this causing the transverse displacement of its flat part 41 relative to clamping jaw 4a that, for its part, remains fixed at this time. Because of the tightening force F of the fiber or fibers 1 and of the relative displacement of the two clamping jaws 4a and 4b, the fiber or fibers roll over the flat part 41 (see arrows t), this causing their torsion.

It will be noted that the transverse displacement of flat part 41 may be limited by lug pieces (not shown) that may be adjustable.

In FIGS. 3a and 3b, there is shown another embodiment of an apparatus according to the invention, for the cutting of a single fiber. The FIGS. 3a and 3b show that apparatus respectively seen from plane IIa/IIa and from plane IIb/IIb in FIG. 1.

It comprises a governing lever 7 that is capable of pivoting around a first horizontal shaft xx' parallel to the longitudinal axis of fiber 1, and that, in that pivoting movement, moves above point C of fiber 1 where it is considered to perform the cutting. Besides, it carries the form 5 meant to place under tension the part of fiber 1 located between tightening means 3 and tightening means 4.

It comprises, respectively downstream from the cutting point (FIG. 3) and upstream from that cutting point (FIG. 3b), soles 4a and 4a on which the fiber to be cut rests. It will be noted that upstream, fiber 1 is shown with its sheath 2. The soles 3a and 4a respectively constitute the clamping jaws 3a and 4a in FIG. 1.

Upstream from the cutting point (FIG. 3b), there is found a shoe 8 that corresponds to clamping jaw 3b in FIG. 1. The shoe 8 normally is above fiber 1 and is equipped with an arm 9 connected, by means of an elastic element such as a spring 10, to a cross part 11 coming as one piece with lever 7.

Thus, when the governing lever 7 is lowered, it drives along arm 9 in its pivoting motion, by means of spring 10. Shoe 8 then is lowered toward fiber 1 and it comes in contact with it. Continuing the lowering of the governing lever 7, spring 10 is compressed and its recall strength is transmitted to fiber 1, via shoe 8.

A screw 12 that, with a rather important play runs through a hole 13a of a second cross part 12 coming as one piece with lever 7, is screwed at the end of arm 9. It ensures the positioning of shoe 8 above fiber 1, whatever its displacement may be.

Downstream from the cutting point (FIG. 3a), there is found a transmission arm 14 resiliently connected, on one side and by means of a spring 15, to cross part 11 and, on the other side, by means of a screw 16, to cross part 13. Screw 16 is screwed to the end of arm 14 and it passes, with a rather important play, through hole 13b of the cross part 13.

A flexible lever 17 is provided so that it can pivot around a second horizontal shaft yy' parallel to the axis of fiber 1. It is meant to press fiber 1 downstream from the cutting point C. Its end 17a plays the part of the clamping jaw 4b in FIG. 1.

A member 18 is provided to transmit the pivoting force of lever 7 to lever 17 in an approximately perpendicular manner, between its point of contact with the fiber and its pivoting shaft yy', approximately in the middle of lever 17. Member 18 is, for example, a screw that is screwed on the transmission arm 14 and that has, at its free end a pin 18a and at its other end a maneuver member 18b. That screw 18 is held in its position by means of a spring 19. Pin 18a is provided to take its support on the upper part of lever 17, approximately in the middle of same.

Member 18, arm 14 and spring 15 constitute the means to cause the flection of lever 17 between its point of contact with the fiber and its pivoting shaft yy'. Other equivalent means could be provided to subject lever 17 to a pressure.

When lever 7 is lowered, it drives along, in its pivoting motion, the transmission arm 14. At a certain point, pin 18a comes in contact with lever 17, this having as a result to create a tightening force on fiber 1. That force is supplied by the memory force of spring 15 that at this time is compressed.

Fiber 1 thus is pressed against sole 3a.

When lever 7 is further lowered, the memory force of spring 15 increases, this having as a result to increase the pressing force of screw 18 on lever 17, thus bringing about the flection of lever 17. The contact point of the latter with fiber 1 moves in the direction transverse to the axis of fiber 1, this causing the rolling of fiber 1 on sole 3a.

Then, the lowering of lever 7 continuing, the form 5 comes in contact with fiber 1 and places it under tension. It will be noted that the fiber is placed under tension at the same time as it is, or after it has been, subjected to a torsion. The point in time when that is so is also determined by the regulating of screw 18.

The more screw 18 is unscrewed, that is to say, the longer its free part is below arm 14, the sooner it drives lever 17 along and the wider is the angle of torsion.

In FIG. 4, there is shown the sole 3a that carries several fibers 1, several fibers from a fiber ribbon for example, as well as the flexible lever 17. There is also shown member 18 provided to exert the flection force on lever 17 and thus cause the rolling of the fibers and their torsion.

A contact among the fibers in the tightening means 3 and 4 would be harmful to their good rotations. Therefore, there have been provided means to position the fibers relative to one another, before they have been subjected to the cutting. These means comprise, for example, a retractable comb 20 constituted by a block into which there are dug, parallel to the longitudinal axis of the fibers, grooves 20a that form lodgings meant to receive these fibers. Once the fibers are in place at the bottom of the grooves 20a, the comb 20 is retracted and the fibers are cut in the above-explained manner.

In the case of several fibers 1, differences in diameter may occur among the fibers, a difference that is harmful to the correct rolling of each one of the fibers, especially if the clamping jaws 4a and 4b are solid and hard. Indeed, the clamping jaw 4a will press on the fibers having the largest diameter and the relative displacement of the two clamping jaws 4a and 4b will result in the placing under torsion of these fibers with larger diameter only. It is possible to remedy this problem by providing for a tightening force F the intensity of which is sufficient to crush the clamping jaws 4a and 4b and thus to make up for the differences in diameter among the fibers.

Another solution may consist in coating one of the two clamping jaws 4a or 4b, or both of them with a thin layer made of a relatively soft material. There have been successfully used, for example, layers of adhesive paper or of adhesive mylar sheets which are soft and of limited thickness. For example, there have been used with success layers of adhesive papers or of adhesive mylar sheets.

The drawback resulting from such a solution is the fact that it requires a constant attention by the operator who must replace on time a lining that has been marked by the fibers.

There is shown in FIG. 6 another solution that gives full satisfaction. The clamping jaw 4a (or 4b) is lined, in its lower part meant to come in contact with the fibers 1, with a layer 50 made of flexible material. A thin blade 51 of a hard material is affixed to clamping jaw 4a so as to cover layer 50. It is possible to provide a lining 52 to make up for the height of layer 50. The connection between blade 51 and the clamping jaw 4a is ensured by means 53 that prevent any relative movement between the jaw 4a and blade 51.

We claim:

1. An apparatus for obliquely cutting at least one optical fiber, said apparatus comprising a cutting edge (6) at a cutting point where a break is to be started on a fiber, mechanical means for subjecting said fiber to a torsion and to a tension, said mechanical means comprising first means (3) for tightening the fiber in order to immobilize it upstream from the cutting point, second means (4) for tightening said fiber downstream from the cutting point, means (5) for exerting a tension force on a part of the fiber between said first and second means (3,4), the second means (4) being formed of two clamping jaws (4a and 4b) at least one of which can move relative to the other one in a direction transverse to a longitudinal axis of the fiber (1), said moving jaw exerting a tightening force on said fiber (1), said movement of said clamping jaws driving said fiber (1) into a rolling motion between said two clamping jaws (4a and 4b) and creating said torsion of fiber (1).

2. An apparatus according to claim 1, wherein the means (5) to exert the tension force comes into play at the same time and after the time that the second means (4) is exerting its torsion force on said fiber part.

3. An apparatus according to either claim 1 or 2, wherein one clamping jaw (4a) is provided to exert the force for the tightening of the at least one fiber (1) that rests on the flat part (41) of a second clamping jaw (4b) that is capable of flexing so as to create a relative displacement of the two clamping jaws (4a and 4b) and the torsion of said fiber or fibers (1).

4. An apparatus according to claim 3, wherein the second clamping jaw (4b) comprises a small beam (42) slanted relative to the direction of the tightening force, and said small beam having a low moment of inertia so that it can be bent.

5. An apparatus according to claim 1 or 2, wherein one of the two clamping jaws (4b) comprises a flexible lever (17), and means (7, 11, 15, 14, 18) to cause said lever (17) to bend between its pivoting shaft and its point of contact with the fiber (1), the point of contact with the fiber then moving in the transverse direction and thus creating said torsion of the fiber.

6. An apparatus according to claim 5, wherein the means to cause the bending of said lever (17) are driven by a governing lever (7) that also drives along a form (5), in the transverse direction relative to the longitudinal axis of the fiber or fibers (1) in order to exert said tension force on said fiber part.

7. An apparatus according to claim 5, wherein said means to cause the flexion of said lever (17) comprise a connecting member (18) to transmit to the lever (17) an approximately perpendicular force, between its point of contact with the fiber and its pivoting shaft.

8. An apparatus according to claim 7, wherein said connecting member (18) is mounted on a transmission arm (14) resiliently connected to a governing lever (7).

9. An apparatus according to claim 8, and an excursion regulating screw screwed into the transmission arm (14).

10. An apparatus according to claims 1 or 2 and means (20) to position the at least one fiber prior to the cutting.

11. An apparatus according to claim 10, wherein said positioning means (20) comprise a retractable comb (20) forming grooves (20a) parallel to the longitudinal axis of the fibers.

12. An apparatus according to claim 1 or claim 2, wherein one of the clamping jaws (4a and 4b) has a face which comes in contact with the at least fiber (1), said face being covered with a layer of flexible material (50).

13. An apparatus according to claim 12 and, a blade (51) affixed to at least one of the clamping jaws (4a 4ab), said blade (51) covering said layer of flexible material (50).

* * * * *